United States Patent Office 2,761,780
Patented Sept. 4, 1956

2,761,780

PROCESS OF TREATING AND CANNING A BEVERAGE

Leonard Daniel Stewart, Miami, Fla., assignor to North American Milk Industries, Inc.

No Drawing. Application February 4, 1952, Serial No. 269,914

7 Claims. (Cl. 99—54)

This invention relates to a process of treating and canning a beverage, and more particularly to a process of treating, obtaining and canning whole milk containing fresh date concentrate.

The high, nutritional value of fresh dates in iron, phosphorous, sugars and numerous essential mineral elements has long been an established fact.

With the above in view it is an object of my invention to provide a highly palatable, nutritious and wholesome flavored milk.

It is another object of my invention to combine the fresh, whole, milk in its natural form and pure and fresh concentrated dates into a palatable and delicious beverage of high nutritional value.

Although milk is rich in most of the essential minerals, proteins, carbohydrates and vitamins, it is deficient in iron from a nutritional standpoint and therefore dates, one of the richest fruits in iron, is a valuable addition to milk. Also dates are rich in other necessary minerals and sugars and further fortifies milk to increase the proportions of the daily requirements of all the essential elements for humans.

Still another object of my invention is to provide a novel process of treating whole milk and incorporating a flavoring nutrient without destroying the qualities of the milk and the nutrient.

A further object of my invention is to provide novel process of treating whole milk with a date concentrate and of preserving the same so that it will keep over a relatively long period of time.

A specific object of my invention is to provide a natural whole milk containing concentrated dates and a stabilizer.

Other objects and features will become apparent from the following detailed description of a preferred embodiment of the novel process of milk treatment.

It will be noted, however, that the description of my invention herein is merely illustrative and is not intended to be limiting or restrictive. The novel process herein described is applied to the treatment and canning of whole cow's milk, whether homogenized or not, and fresh pure concentrated dates in hermetically sealed usual type of containers. The milk as treated and packed in such containers will keep for relatively long periods of time.

In my process, milk of good quality, and as fresh as possible from time of milking is used. An "apparent" acidity of .14% in the milk is desirable. Also, the milk is satisfactory if standardized at 3.5% which is recognized as standard, whole milk, butterfat contents in most states of the United States and also in most of the foreign areas.

The whole milk is first placed into storage or holding tanks after being suitably cooled to approximately 40° F. or 45° F., then clarified and homogenized at 135° F. and 2500 lbs. per square inch. If desired the step of homogenizing the milk may be omitted whereupon the fat globules may be kept in suspension by the additive means hereinafter indicated. From these tanks, it is run into mixing kettles, fitted with agitators wherein the milk is mixed with a concentrated date paste which has been initially ground and reduced to a butterlike or apple butter consistency by screening through fine mesh screens. The dates are usually mixed with the milk in the proportions of about 65 lbs. of concentrated dates to each 100 gallons of milk. The milk and dates are then mixed by the agitator, running at slow speed and at a temperature of approximately 80° F. for a period of approximately ten minutes or when the dates and milk are thoroughly intermixed. After mixing, the resulting consistency is then run through a screen of about .020 mesh. This screening operation is to remove the fine residue of seed of the date which would otherwise precipitate to the bottom of the can during the storage of the milk if not removed. At this point a gelatin stabilizer is added to the extent of one ounce to about 64 lbs. of dates and 100 gallons of milk. I have found that a stabilizer known commercially as "Krim-ko-gel" is quite suitable to my purpose, although I am not restricted to the same, since I may use gum acacia, tragacanth, Irish moss, karaya, or any of their derivatives.

The date, milk and stabilizer mixture is then heated to 131° F. and preferably rehomogenized at pressure of 500 lbs. per square inch which I find to be the most effective pressure in contributing to the effective suspensory property of the date concentrate in the milk. In this connection I may add the stabilizer after the second homogenizing step instead of after the first homogenizing step. From the homogenizer, the mixture is then cooled to 100° F. and passed through a deaerator under 25 inches of vacuum mercury. The purpose of the deaeration is to remove most of the oxygen and other volatile substances, which removal contributes greatly to retarding the oxidizing action common to all fresh milk in storage, and which is in conjunction with other preventive measures explained later in this specification. Although the term "oxidizing" is used herein, it has not the exact meaning as indicated in chemistry but is merely used to describe the flat or stale flavor which develops in milk.

The common practice of inhibiting development of this oxidized flavor is by the application of high heat which in turn causes many adverse changes in milk, particularly in the mixture of whole milk fortified with date concentrate. Therefore, as I do not by my invention use the high prolonged heat application as a preventive for the oxidized flavor, I use the following in conjunction with deaeration to combat the development of the oxidized flavor.

The development of the oxidized flavor is due to many contributory causes of which the principal one is the loss of the normal value of the ascorbic acid destroyed in the usual course of milk handling. The probable normal variation of this constituent is about 22 to 29 milligrams per quart. Also ascorbic acid is a natural component of milk and its quantative value of normal variation has its own reducing properties to inhibit oxidation. Therefore, to materially retard oxidation, the milk should have its normal variable content and as this is largely destroyed by handling, it has to be restored to its initial reducing capacity. My experiments have indicated the initial oxidizing actions of the milk in storage destroy the ascorbic acid to a certain point and then the milk recovers and starts to form its own reducing properties. Therefore, the ascorbic acid content of the milk is restored to or above its normal variation at the time of filling into cans so that it should have an initial reducing capacity that even after loss in this value, enough reducing capacity should remain to prevent the progressing of oxidation until the milk can form its own reducing capacities or properties.

The restoration of from 20 to 30 milligrams per quart of powdered or crystalline ascorbic acid will bring to or slightly above normal the variation of the ascorbic acid constituent. Between the final reheating operation after leaving the deaerator and the filling bowl, is the point in the operation I choose to introduce the proper proportions of ascorbic acid into the flow of the milk before it reaches the filler bowl. This is accomplished by mixing the powdered or crystalline ascorbic acid with enough water to completely dissolve the ascorbic acid, so the water solvent would contain the ascorbic acid in the proportion to 20 to 30 milligrams to every quart of milk to be restored. The volume of water involved would not in any case be more than one half pint to each one hundred gallons of milk and 64 lbs. of concentrated dates. The amount of ascorbic acid is also governed by the season of the year in which the milk is being produced. The 20 milligram figure should accomplish the purpose above indicated during the season when the cow is feeding in open pasture as the milk is less susceptible to the flavor development at that time. In the season when the cow's rations are dry feed such condition increases the susceptibility of the milk to the flavor development, the ascorbic acid restoration in such case should be at least 30 milligrams per quart.

After the above step is performed, the milk is then piped at a temperature of 195° F. to a filler from which it is filled into cans or containers at the 195° F. temperature. Vitamins A, B and D may be added and the head space in the can is then purged by means of an inert gas. The cans are then carried to a sealing machine where the cover is sealed onto the can in the usual manner.

It will be noted that the cans or other containers are sterilized prior to filling by heating with steam in suitable sterilizer apparatus. This is accomplished by introducing the cans or other containers into suitable passages or tunnels to retain the steam pressure and conveying them through the passages or tunnels into which steam at high sterilizing temperatures 270° F. to 300° F. is introduced. The tunnel or passage is of such length that the time required for the can or container to travel the entire length is sufficient at the steam temperature maintained inside the tunnel or passage to completely sterilize the can or container. This tunnel or passage is carried directly to the filler valves. The filler valves are at all times protected from the accidental introduction of spoilage bacteria by means of a surrounding and enveloping bath of live steam. This step in the operation insures both the can and the contents to attain approximately the same degree of sterilization, which greatly decreases the holding time of the elevated temperature necessary in the final sterilization process.

The next step is the sterilization process in which the sealed can and contents are sterilized for about five minutes at 240° F. The cans are then ejected after about 5 minutes treatment and carried by suitable coveying belts to a cooler unit of spin and tray design. This is of common design in cooling operations. The cans are carried on their sides in a rolling motion and they are sprayed during their travel from overhead to cool at a temperature of about 34° F. At the end of travel in the cooling unit the cans are thoroughly chilled and the residual heat is entirely dissipated for the storage of the cased product. As the example as heretofore described is based on 10 oz. cans, there ordinarily are adjustments necessary for application to various other size cans, in time and temperature. The head space in such cans is that customary in the industry.

The heretofore described example is not to be considered as restricting the invention to just this size of container but as indicated above the diameter of the can decides the heat and time elements in the processing. The temperature and times will apply likewise to all the heights in this particular diameter concerned.

By my invention as described herein, it will be noted that I process and produce a whole milk which is fortified with freshly picked concentrated dates forming a highly nutritious, pleasant and palatable product which can be canned and kept in storage over a relatively long period of time for as long as six months without noticeable change in composition. Such milk may or may not be homogenized and/or fortified by vitamins.

A product obtained by my process has the following analysis:

| | | |
|---|---|---|
| Bacteria count | | 0 |
| Total solids | per cent | 17.7 |
| Non-fat solids | do | 14.0 |
| Fat solids | do | 3.7 |
| Specific gravity | | 1.042 |
| Acidity | per cent | 0.23 |
| pH Value | | 6.3 |
| Phosphatase | | Negative |
| Stabilizer present | per cent | [1] 0.01 |

[1] Irish moss derivative.

While a preferred process embodying my invention has been described, it is to be noted that changes as to size, form, arrangement and procedure may be made without departing from the spirit and scope of my invention as claimed.

What is claimed is:

1. In the process of treating, flavoring, and fortifying milk, to which has been added a concentrated date mixture to whole homogenized milk, filtering, stabilizing the filtrate, heating to about 131° F. and cooling to about 100° F., deaerating the filtrate at about 25" of vacuum, reheating said filtrate to about 195° F., pouring the filtrate into a sterilized container which has been initially heated to a temperature of about 275 to 300° F., purging the head space in the container, sealing the container and sterilizing and then chilling while constantly tumbling and spinning the container.

2. In the process of treating and flavoring milk comprising clarifying and homogenizing the same, adding a concentrated date mixture which has initially been reduced to a butterlike consistency to the homogenized milk the ratio being about 64 lbs. of date mixture to 100 gals. of milk, agitating, then filtering, adding a gelatin substance to the filtrate, heating and homogenizing again at about 500 lbs. per sq. in., cooling to about 100° F., deaerating the filtrate at 25" vacuum, reheating said filtrate to about 195° F., pouring into a sterilized container which has been initially preheated to a temperature higher than the milk, purging the head space in the container, sealing the container and sterilizing and then chilling to about 34° F. while constantly shaking the container.

3. The process of treating milk comprising clarifying the same, adding a concentrated date mixture to the clarified milk, filtering, stabilizing the filtrate, heating and homogenizing the milk, cooling, deaerating the filtrate, reheating said filtrate, pouring into a sterilized container which has been heated to a temperature higher than the milk, purging the head space in the container, sealing the container and sterilizing and then chilling the milk in the container with constant shaking to about 34° F.

4. The process of treating whole milk comprising clarifying and homogenizing the same at 135° F. and 2500 lbs. per square inch adding a concentrated date mixture to the homogenized milk at a temperature of about 80° F., filtering, stabilizing the filtrate by the addition of gelatin, heating and homogenizing again at 500 lbs. per square inch, cooling, adding vitamins, deaerating the filtrate in vacuo, reheating said filtrate, pouring into a previously sterilized container which has been heated to a temperature up to 280° F., purging the head space in the container by means of an inert gas, sealing the container and sterilizing and then chilling to about 34° F. while rolling the container.

5. The process of treating whole milk comprising clarifying and homogenizing the same at about 135° F. and 2500 lbs. per square inch, adding a concentrated date mixture to the homogenized milk in the proportion of 64 lbs. of date concentrate to 100 gallons of the milk, filtering, stabilizing the filtrate by the addition of a gelatin, heating and homogenizing again at about 500 lbs. per square inch, cooling to about 100° F. deaerating the filtrate in vacuo at about 25 inches reheating said filtrate to about 195° F. pouring into a sterilized container which has been previously heated to about 275°–300° F., adding vitamins, purging the head space in the container, sealing the container and sterilizing at a temperature of about 195° F. for three minutes and then at about 280° F. for about 30 seconds and then chilling to about 34° F. while rolling the container.

6. The process of treating whole homogenized milk comprising adding about 64 lbs. of concentrated date to about 100 gallons of milk, agitating, then filtering, adding a gelatin stabilizer to the filtrate in the proportion of about one ounce per 64 lbs. of date concentrate and 100 gallons of milk, heating and cooling, deaerating the filtrate in vacuo at 25 inches, reheating said filtrate, pouring into a sterilized container, purging the head space in the container, sealing the container, sterilizing and then chilling to about 34° F.

7. The process of treating milk comprising homogenizing the same, adding a concentrated date mixture to the homogenized milk, filtering, stabilizing the filtrate, heating and homogenizing again, cooling, adding ascorbic acid and vitamins A, B and D and stirring, deaerating the filtrate, reheating said filtrate, pouring into a sterilized container, evacuating the head space in the container, sealing the container and sterilizing and then chilling with constant rolling of the container on its side to effect rapid dissipation of the heat.

References Cited in the file of this patent

UNITED STATES PATENTS

| 1,646,671 | Webb | Oct. 25, 1927 |
| 2,049,591 | Rafn | Aug. 4, 1936 |
| 2,132,099 | Doering et al. | Oct. 4, 1938 |
| 2,148,100 | Browne | Feb. 21, 1939 |
| 2,390,872 | Dahlberg et al. | Dec. 11, 1945 |

OTHER REFERENCES

Everybody's Cook Book, by I. E. Lord, published 1924, by Henry Holt & Co., New York, pages 262, 263 and 264.